United States Patent
Matsuo et al.

(10) Patent No.: US 7,113,457 B2
(45) Date of Patent: *Sep. 26, 2006

(54) INFORMATION REPRODUCING SYSTEM HAVING MEANS FOR PREVENTING A BREAKDOWN THEREOF CAUSED BY ABNORMAL CONDITIONS

(75) Inventors: Kazunori Matsuo, Saitama-ken (JP); Yasutaka Suzuki, Saitama-ken (JP); Masakazu Takahashi, Saitama-ken (JP); Yoshimichi Nishio, Saitama-ken (JP); Hideaki Watarihana, Saitama-ken (JP); Hiroki Goto, Saitama-ken (JP); Teruo Takahashi, Saitama-ken (JP); Kiyoshi Furukawa, Saitama-ken (JP); Hiroyuki Kobayashi, Saitama-ken (JP); Hidetsugu Kubota, Saitama-ken (JP); Takuya Abe, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 81 days.

This patent is subject to a terminal disclaimer.

(21) Appl. No.: 10/892,155

(22) Filed: Jul. 16, 2004

(65) Prior Publication Data
US 2004/0257923 A1    Dec. 23, 2004

Related U.S. Application Data

(63) Continuation of application No. 10/412,575, filed on Apr. 14, 2003, now abandoned, which is a continuation of application No. 09/427,588, filed on Oct. 27, 1999, now Pat. No. 6,683,826.

(30) Foreign Application Priority Data

Oct. 28, 1998 (JP) .................................. 10-307135

(51) Int. Cl.
*G11B 7/085* (2006.01)
(52) U.S. Cl. .................................. 369/30.27; 369/30.36
(58) Field of Classification Search ............. 369/30.27, 369/30.36; G11B 7/085
See application file for complete search history.

(56) References Cited

U.S. PATENT DOCUMENTS

| | | | | |
|---|---|---|---|---|
| 5,038,331 | A * | 8/1991 | Ogawa | 369/30.89 |
| 5,524,003 | A | 6/1996 | Tsuchiya | 369/191 |
| 5,870,360 | A | 2/1999 | Ito et al. | 369/36 |
| 5,872,748 | A | 2/1999 | Shindo et al. | 369/38 |
| 6,052,356 | A | 4/2000 | Fujimoto et al. | 369/192 |
| 6,058,097 | A | 5/2000 | Inoue | 369/192 |
| 6,574,171 | B1 * | 6/2003 | Furukawa et al. | 369/30.36 |
| 6,683,826 | B1 * | 1/2004 | Matsuo et al. | 369/30.36 |

FOREIGN PATENT DOCUMENTS

| | | |
|---|---|---|
| EP | 0 331 839 | 11/1988 |
| EP | 0331839 | * 11/1988 |

* cited by examiner

*Primary Examiner*—Aristotelis M. Psitos
(74) *Attorney, Agent, or Firm*—Arent Fox PLLC

(57) ABSTRACT

An information recording medium reproducing system has an insertion opening, a recording medium storing portion and a medium carrying device. Photodetectors are provided for detecting passing of the recording medium and for producing a passing signal when the medium passes. A controller is provided for controlling operation of the medium carrying device. The controller applies a discharge signal to the medium carrying device when the passing signal is not produced within a predetermined time, whereby the medium carrying device is actuated in discharge operation.

11 Claims, 10 Drawing Sheets

INFORMATION REPRODUCING SYSTEM HAVING MEANS FOR PREVENTING A BREAKDOWN THEREOF CAUSED BY ABNORMAL CONDITIONS

RELATED APPLICATIONS

This is a Continuation of application Ser. No. 10/412,575 filed Apr. 14, 2003, now abandoned which in turn is a Continuation Application of Parent application Ser. No. 09/427,588 filed Oct. 27, 1999, now U.S. Pat. No. 6,683, 826. The disclosure of the prior applications is hereby incorporated by reference herein in its entirety.

BACKGROUND OF THE INVENTION

The present invention relates to a system for reproducing information recorded on an information recording medium.

The applicant of this patent application has provided an information reproducing system disclosed in Japanese Patent Applications 10-107265 and 10-107266.

In the system, an opening is formed at a front panel of a housing for inserting and discharging an optical disc. In the housing, there is provided a plurality of trays for storing recording mediums, a clamp mechanism for positioning the recording medium, and a pickup for reading recorded information.

The trays are stacked and disposed adjacent the opening, and vertically moved so as to position a desired tray at the opening and the clamp mechanism.

When a user instructs a desired tray, the tray is automatically positioned at the opening. When the user inserts an information recorded medium in the opening, the information recorded medium is automatically stored on the tray. Thereafter the stack of trays is vertically moved to a waiting position.

When the user instructs a desired recording medium stored in a tray, the tray is moved to the clamp mechanism, and the information recorded on the recording medium is reproduced by the pickup and a reproducing device.

When the user instructs to discharge a recording medium, the tray storing the recording medium is moved to the opening and the recording medium is discharged from the opening.

If the user inserts a foreign object in the opening or a recording medium is stuck in the device, and the tray is moved in such a condition, the device may break.

SUMMARY OF THE INVENTION

An object of the present invention is to provide a system for reproducing information recorded on an information recording medium which may prevent the breakdown of the system caused by abnormal conditions.

According to the present invention, there is provided an information recording medium reproducing system having an insertion opening, a recording medium storing portion and a medium carrying device, the system comprising, instructing means for instructing insertion of the medium in the system, detecting means disposed between the insertion opening and the recording medium storing portion for detecting passing of the recording medium and for producing a passing signal when the medium passes, control means for controlling operation of the medium carrying device, the control means being provided for applying a discharge signal to the medium carrying device when the passing signal is not produced within a predetermined time after the insertion instruction, whereby the medium carrying device is actuated in discharge operation.

The control means is provided for generating a warning signal for giving a user warning of abnormality when the passing signal is not produced within the predetermined time.

The detecting means comprises a plurality of photodetectors.

The photodetectors are disposed for discriminating kinds of the recording mediums.

These and other objects and features of the present invention will become more apparent from the following detailed description with reference to the accompanying drawings.

DETAILED DESCRIPTION OF THE PREFERRED EMBODIMENT

Figure 1:
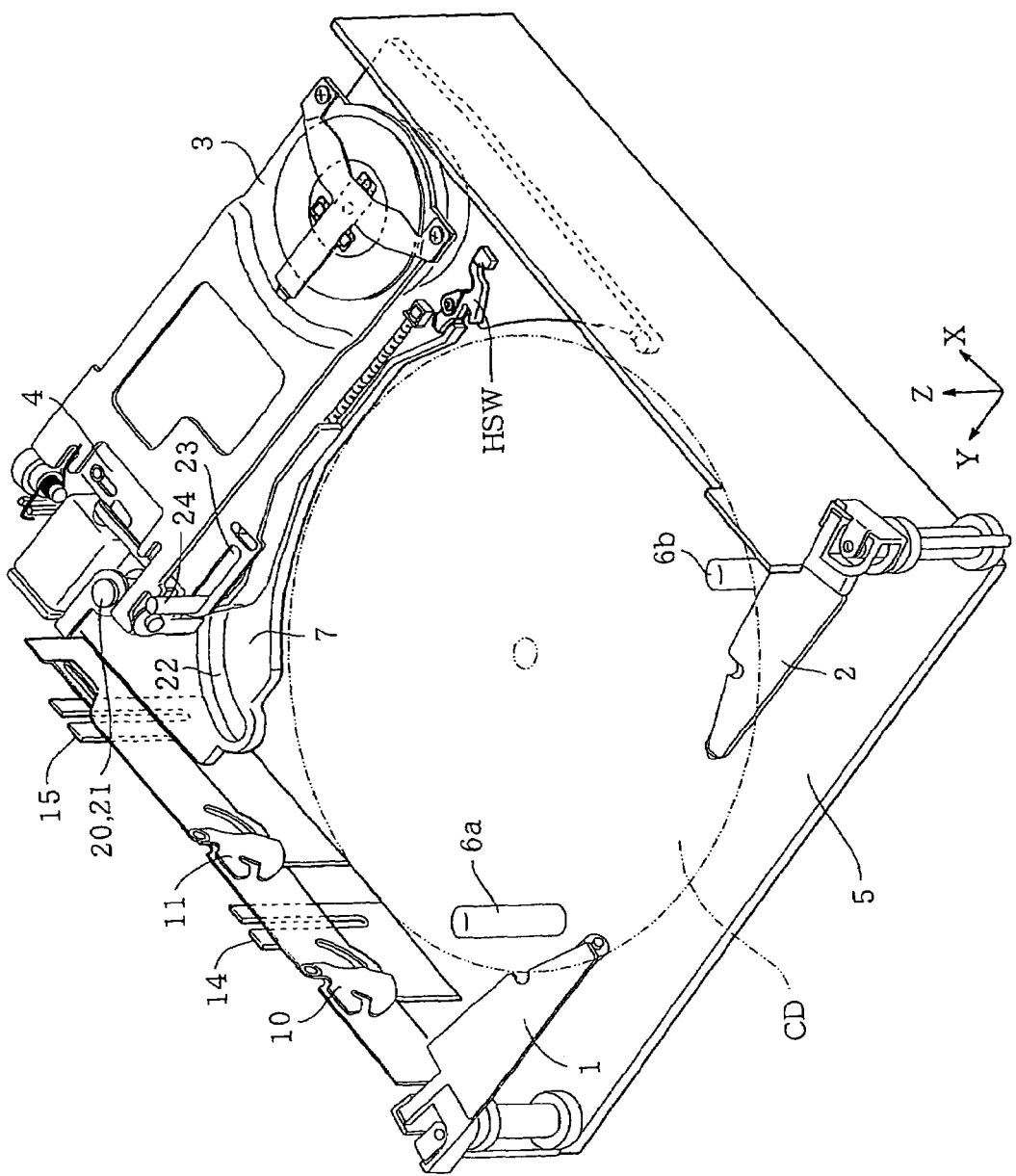
FIG. 1 is a perspective view showing a fixed chassis.

Referring to FIG. 1, the system of the present invention has a pair of disc carrying mechanisms 1 and 2, a clamp mechanism 3, a pickup 4, a pair of shafts 6*a* and 6*b* mounted on a fixed chassis 5.

Figure 2:
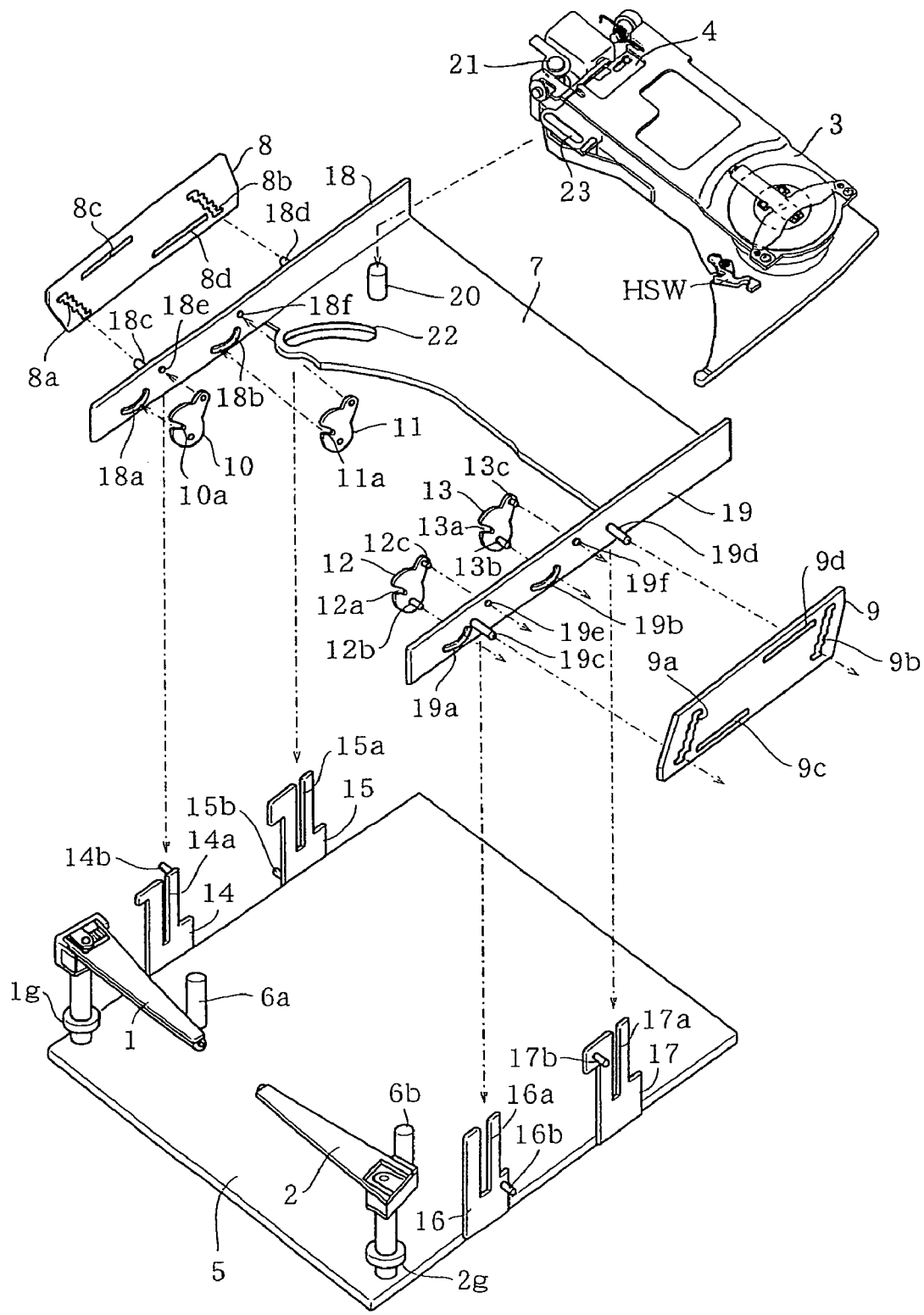
FIG. 2 is a perspective view showing a movable chassis.

Referring to FIG. 2, there is provided a vertically movable chassis 7, a pair of driving plates 8 and 9 for moving the movable chassis 7, sway members 10, 11, 12 and 13.

A disc detecting switch HSW is provided at an end portion of the pickup 4.

At lateral both sides with respect to the disc carrying direction X, vertical plates 14, 15, 16 and 17 having guide grooves 14*a*, 15*a*, 16*a* and 17*a* are extended from the fixed chassis 5. Engaging pins 14*b* and 17*b* are provided on upper portions of the plates 14 and 17 at the outsides thereof, and engaging pins 15*b* and 16*b* are provided on lower portions of plates 15 and 16.

On both sides of the movable chassis 7, side plates 18 and 19 are formed to be slid on the plates 14, 15, 16 and 17. Cam holes 18*a*, 18*b*, 19*a* and 19*b* are formed in the side plates 18 and 19. Pins 18*c*, 18*d*, 19*c* and 19*d* are provided on the outside of the plates 18 and 19.

In the driving plate 8, a pair of stepwise cam holes 8*a* and 8*b* and a pair of guide holes 8*c* and 8*d* are formed. In the driving plate 9, a pair of stepwise cam holes 9*a* and 9*b* and a pair of guide holes 9*c* and 9*d* are formed. The cam holes 8*a*, 8*b* and cam holes 9*a*, 9*b* are inclined in the opposite directions, and guide holes 8*c*, 8*d* and guide holes 9*c*, 9*d* are reversely disposed in height.

In the sway plates 10, 11, 12 and 13, notches 10*a*, 11*a*, 12*a* and 13*a* are formed. On the sway plates 12, 13, there is provided support pins 12*c*, 13*c* to be engaged with holes 19*e*, 19*f* of the side plates 19, and engaging pins 12*b*, 13*b* to be engaged with cam holes 19a, 19b formed in the side plate 19. Each of the sway plates 10, 11 has the same support pin and engaging pin as the sway plate 12.

The sway plates 10, 11, 12 and 13 are rotatably mounted on the side plates 18, 19 so as to be swayed about the holes 18e, 18f, 19e and 19f by the cam holes 18a, 18b, 19a and 19b.

Engaging pins 18c, 18d, 19c and 19d engage with guide grooves 14a, 15a, 16a and 17a so that the movable chassis 7 is vertically moved. Ends of the pins 18c, 18d, 19c, 19d extended from the guide grooves 14a, 15a, 16a, 17a are engaged with cam holes 8a, 8b, 9a, 9b of the driving plates 8, 9, respectively. The pins 14b, 15b, 16b and 17b are slidably engaged with guide holes 8c, 8d, 9c, 9d of the driving plates 8, 9.

The driving plates 8, 9 are horizontally move in the opposite directions by a driving device (not shown), so that the movable chassis 7 is vertically moved by the stepwise cams 8a, 8b, 9a, 9b.

The sway places 10, 11, 12, 13 are swayed by the cam holes 18a, 18b, 19a, 19b.

The pickup 4 is rotatably mounted on the movable chassis 7 by the engagement of a hole 21 with a shaft 20 on the chassis.

As shown in FIG. 1, a drive pin 24 is engaged with a guide hole 22 of the movable chassis 7 and with an elongated hole 23 of the pickup 4. By moving the drive pin 24, the pickup and the clamp mechanism 3 are rotated about the shaft 20.

Figure 3:
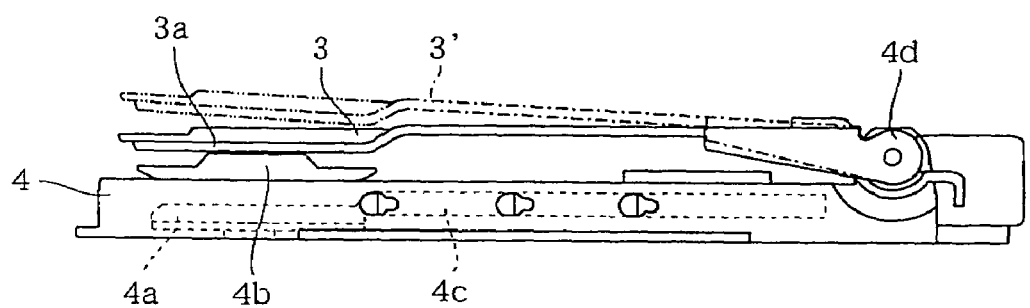
FIG. 3 is a side view of the pickup.
Figure 4:
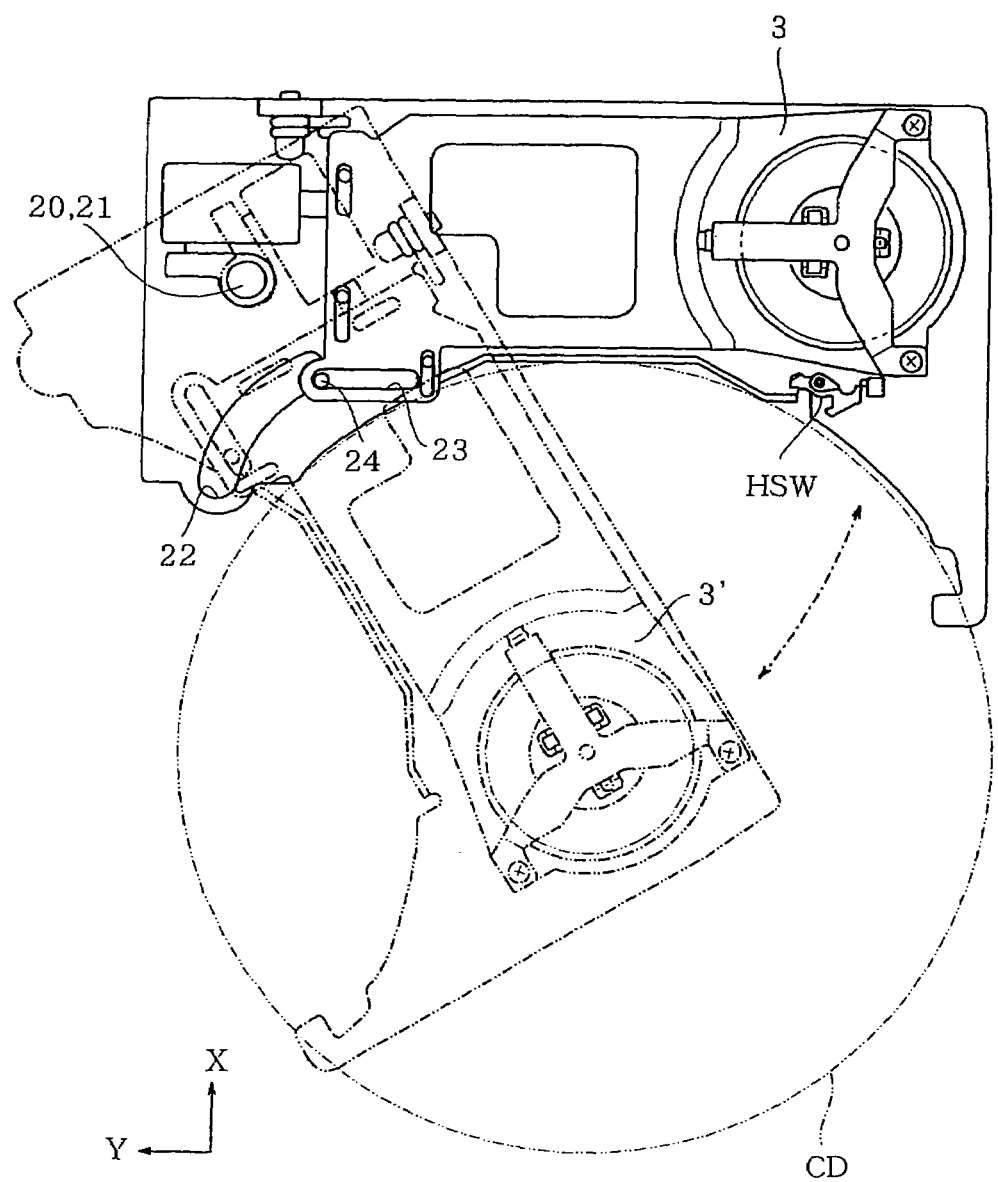
FIG. 4 is a plan view of the pickup and the clamp mechanism.

FIG. 3 is a side view of the pickup 4, and FIG. 4 is a plan view of the pickup and the clamp mechanism 3.

As shown in FIG. 3, a drive motor 4a is provided in a case of the pickup 3. On the rotating shaft of the motor 4a, a turntable 4b is secured for mounting a CD. A carriage 4c is also provided in the case, on which a pickup body (not shown) is mounted.

The clamp mechanism 3 is pivotally mounted on the pickup 4 by a hinge 4d and has clamp portion 3a for clamping the CD on the turntable 4b.

The clamp mechanism 3 is pivoted as shown by numeral 3' in FIG. 3 for loading the CD on the turntable 4b. Further, the clamp mechanism 3 and pickup 4 are rotated as shown by dot-dash lines in FIG. 4 for reproducing the CD.

Figure 5:
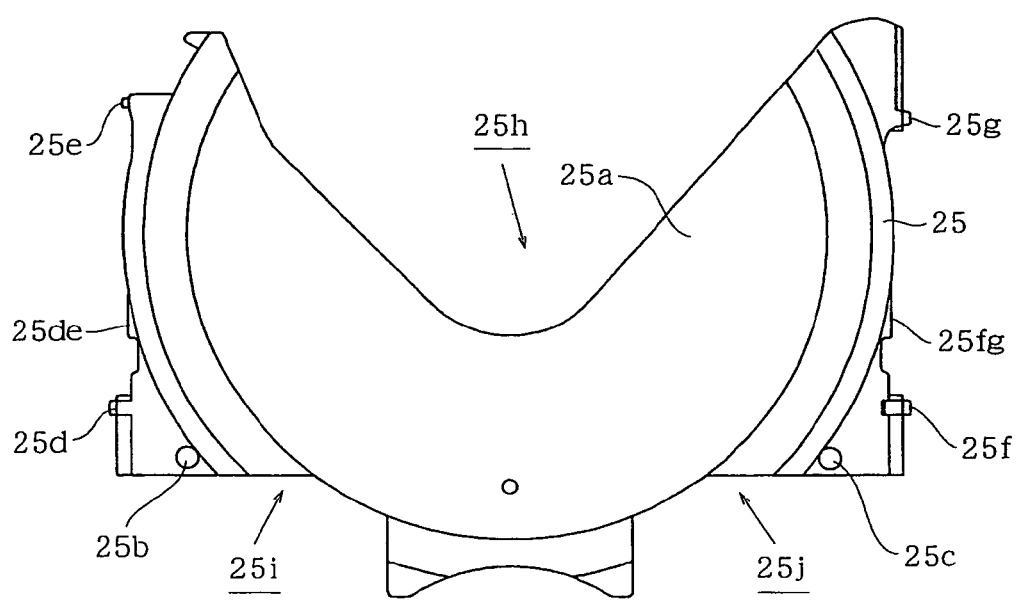
FIG. 5 is a plan view of a tray.
Figure 6:
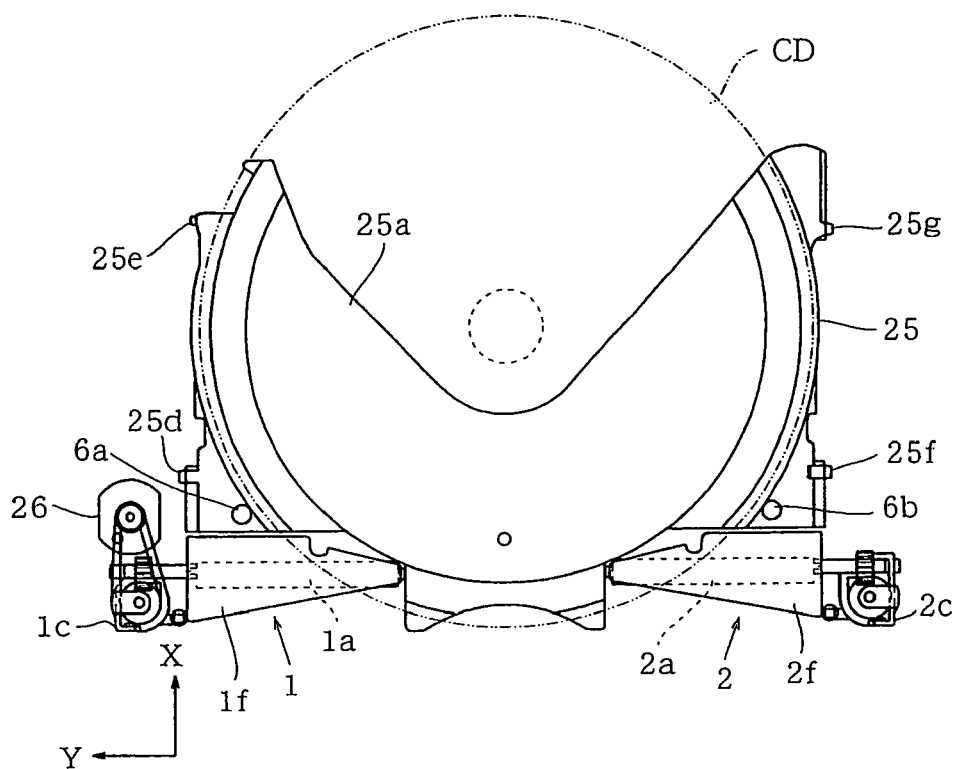
FIGS. 6*a* and 6*b* are plan views showing the tray and a CD.
Figure 6:
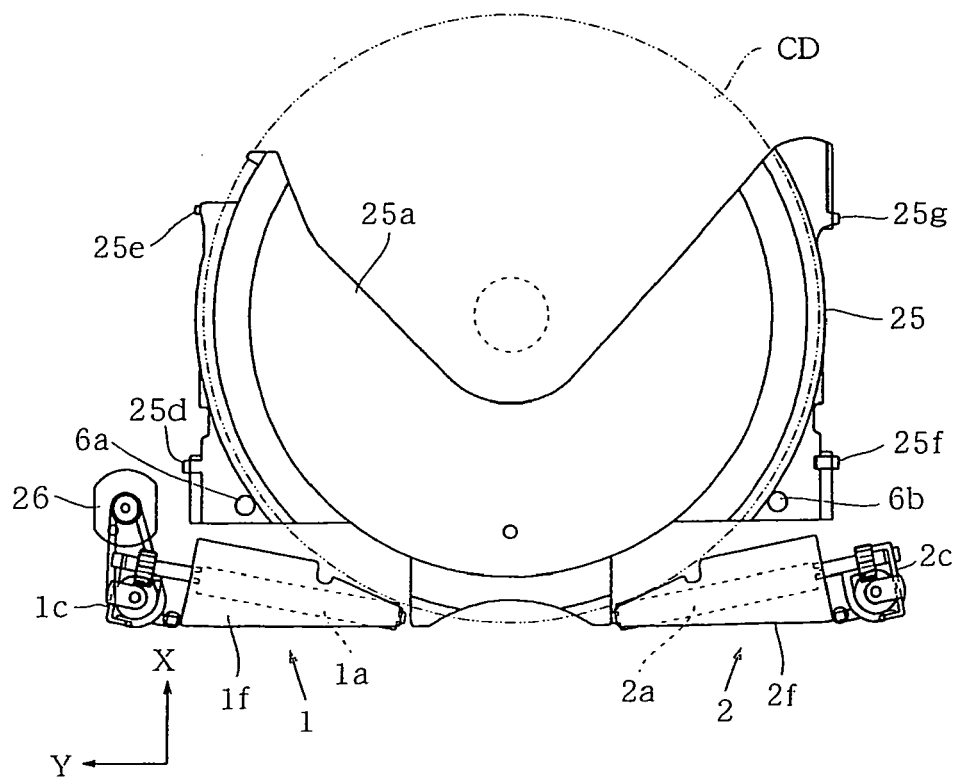

FIG. 5 is a plan view of a tray, and FIGS. 6a and 6b are plan view showing the tray and the CD.

Referring to FIG. 5, a tray 25 has a disc supporting plate 25a having a V-shaped notch 25h. On the both sides of the plate 25a, there is provided a pair of holes 25b, 25c in which shafts 6a, 6b (FIG. 1) are to be engaged, engaging pins 25d, 25e, 25f and 25g to which sway plates 10, 11,12, 13 (FIG. 2) are engaged, and recesses 25i, 25j for preventing the carrying mechanisms 1, 2 from contacting with the tray 25.

In the V-shaped notch 25h, the pickup 4 and clamping mechanism 3 are to be positioned as shown by the dot-dash lines in FIG. 4 at the reproduction of the CD.

In the present embodiment, six trays 25 are stacked and supported by the shaft 6a, 6b (FIGS. 1 and 2).

An elevating mechanism (not shown) is provided to be engaged with side plates 25de and 25fg of a lowermost tray so as to elevate the stack of the trays along the shafts 6a, 6b.

Referring to FIGS. 6a and 6b, in the recess 25i, 25j (FIG. 5), the disc carrying mechanisms 1, 2 are disposed. The disc carrying mechanisms are positioned toward the tray in the operating state as shown in FIG. 6a, and retracted in the non-operating state as shown in FIG. 6b when the trays are vertically moved.

Figure 7:
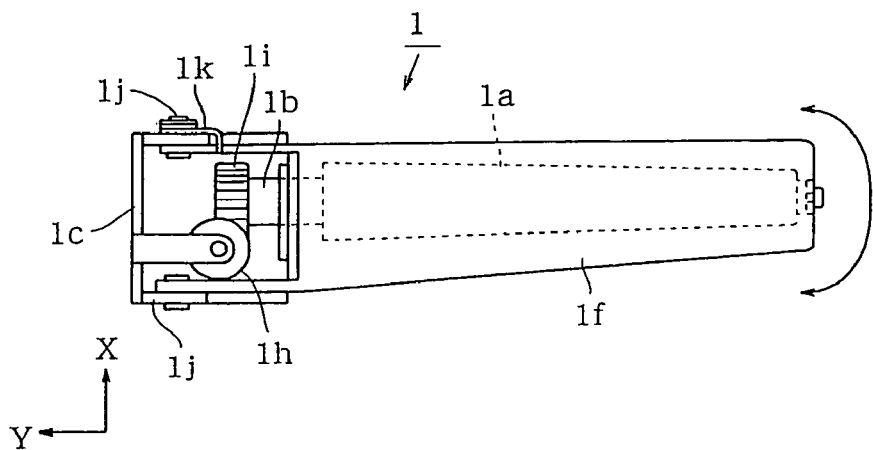
FIG. 7*a* is a plan view of a disc carrying mechanism.
FIG. 7*b* is a front view thereof.
Figure 7:
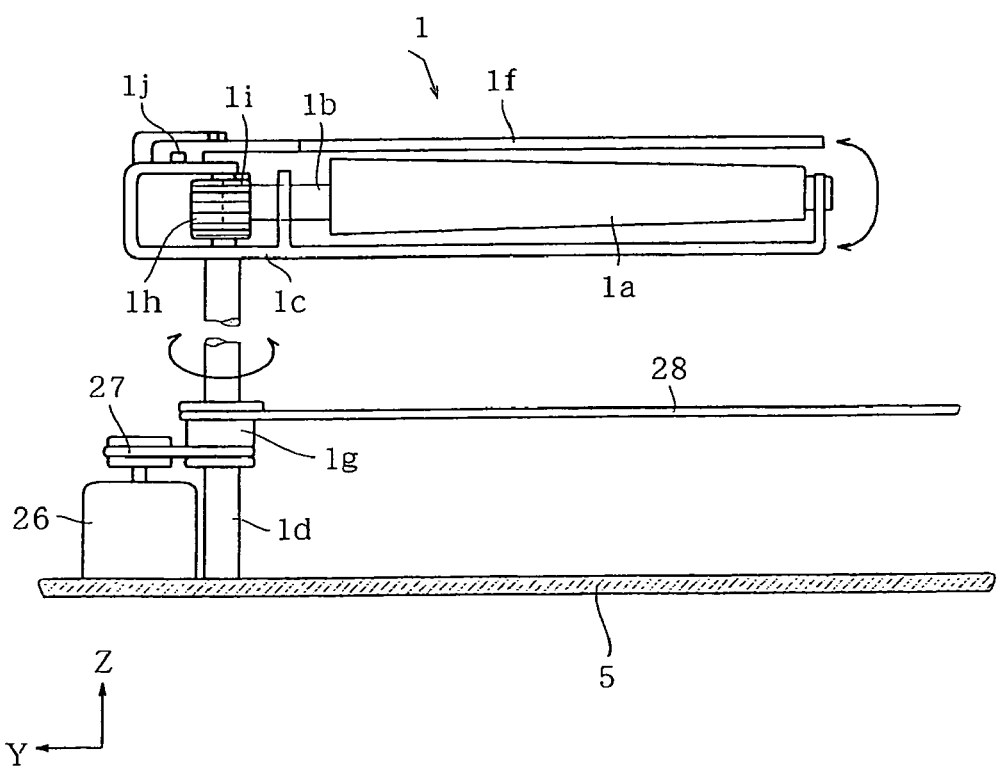

FIG. 7a is a plan view of the disc carrying mechanism, and FIG. 7b is a front view thereof.

The disc carrying mechanism 1 comprises a rotating shaft 1b having a roller 1a made of rubber, a support frame 1c for supporting the shaft 1b, a driving shaft 1d rotatably mounted on the fixed chassis 5 and an engaging plate 1f.

The shaft 1d is connected to the shaft 1b by a worm 1h and worm wheel 1i, and connected to a rotating shaft of a motor 26 by a pulley 1g and a belt 27. The shaft id is further connected to a pulley 2g (FIG. 2) of the carrying mechanism 2 by a belt 28.

The frame 1c is rotatably mounted on the shaft 1d and vertically swingably mounted at an end 1j. The engaging plate if is urged by a spring 1k to the roller 1a so as to grip the CD together with the roller 1a to carry the disc.

Thus, the rollers 1a, 2a are rotated, and the engaging plates 1c and 2c are swung by the motor 26, thereby carrying the CD inserted in the front opening to the turntable and discharging the disc.

Figure 8:
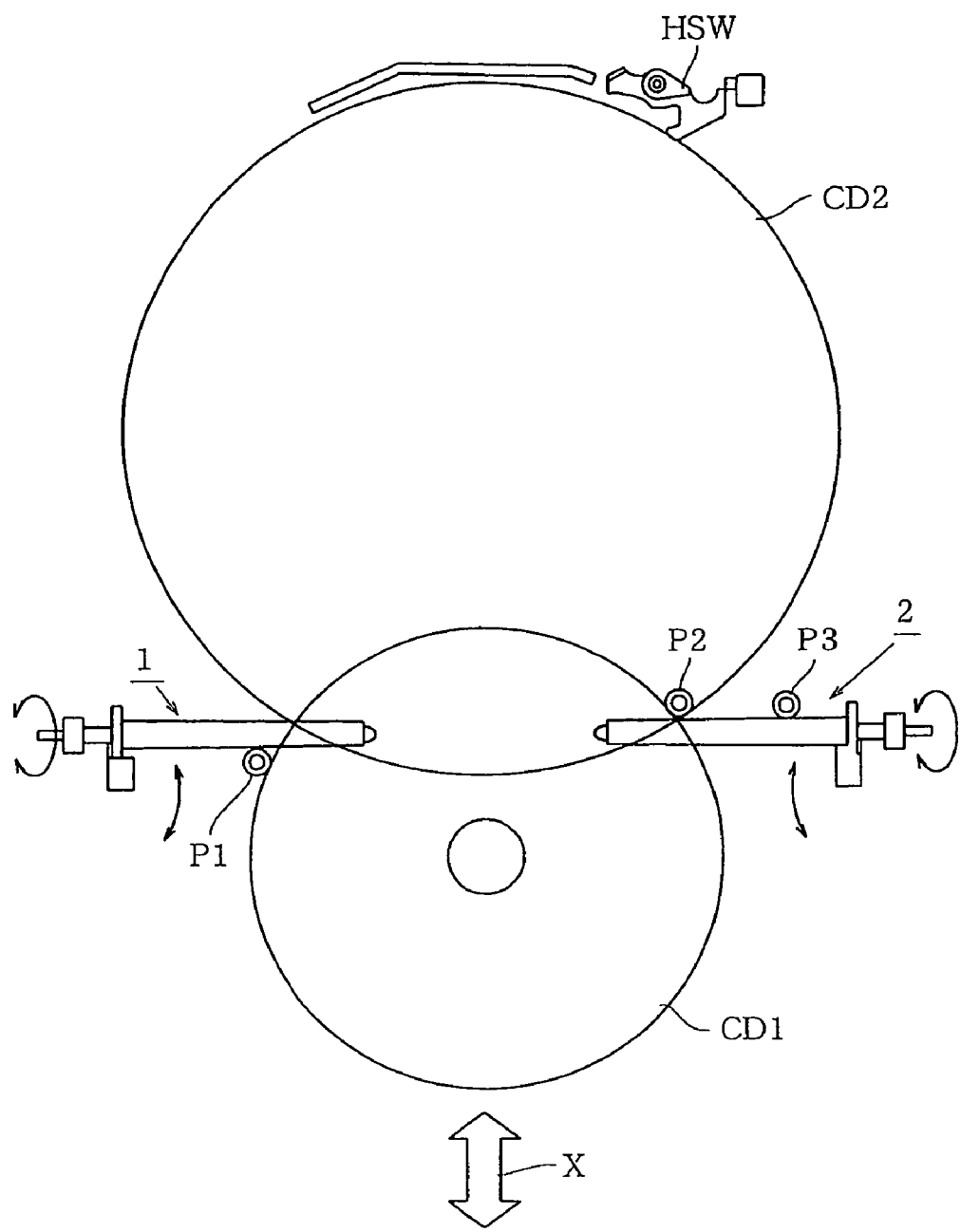
FIG. 8 is a diagram showing an arrangement of photodetectors.

Referring to FIG. 8, there is provided three photodetectors P1, P2, P3 for detecting the size of the CD. The detectors P1 and P2 are disposed at a distance smaller than the diameter of the 8 cm disc CD1, and detectors P1 and P3 are disposed at a distance larger than the diameter of 8 cm disc CD1 and smaller than the diameter of the 12 cm disc CD2. Thus, the discs CD1 and CD2 can be discriminated.

Figure 9:
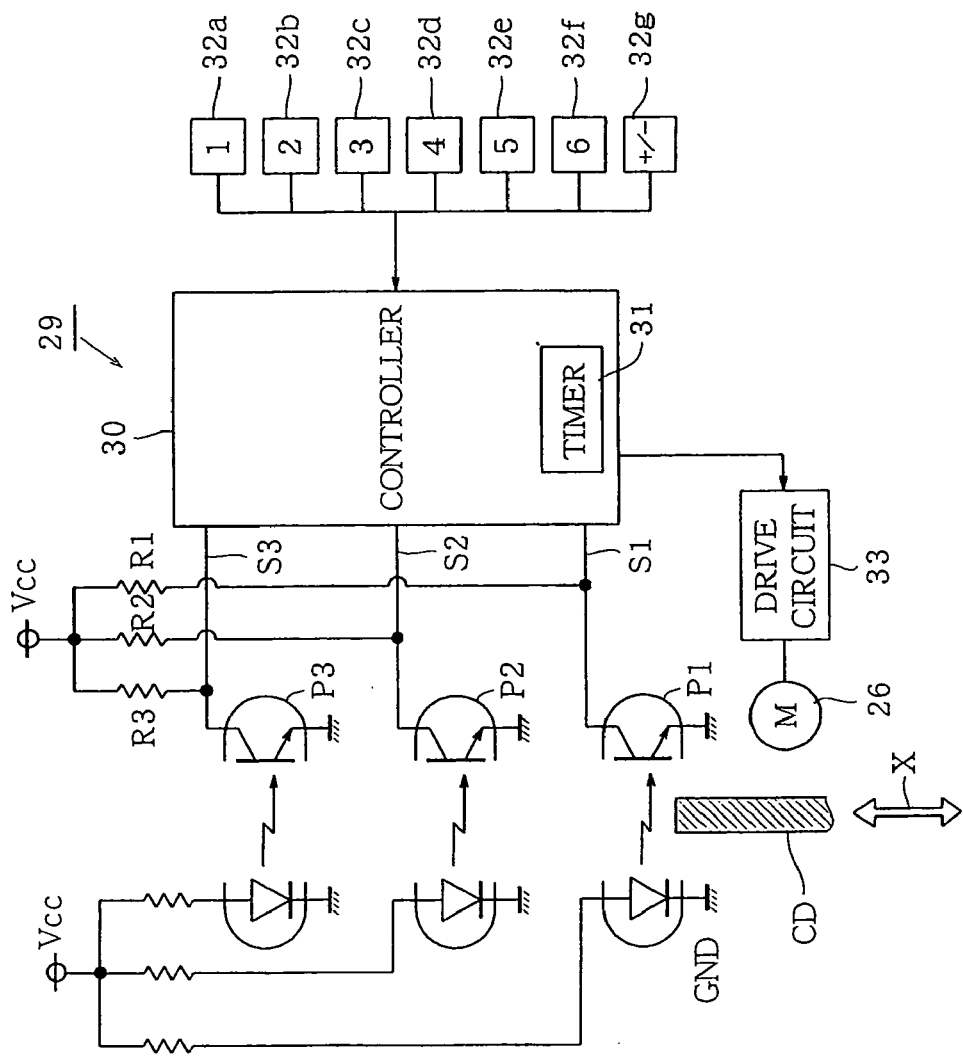
FIG. 9 shows a block diagram of a control circuit.

FIG. 9 shows a control circuit 29. As shown in FIG. 9, each of the photodetectors P1 to P3 is composed by a light emitting diode and a photo-transistor connected between Vcc and the ground GND.

When the CD passes between the photodetectors P1–P3, voltages at resistors R1, R2 and R3 change to provide signals S1, S2 and S3 which are applied to a controller 30 so that the existence and the size of the CD are detected.

There is provided instruction switches 32a–32f for instructing the addresses of six trays 25, a cancel switch 32g for canceling the address instruction, a driving circuit 33 for driving the motor 26 and a timer 31.

Figure 10:
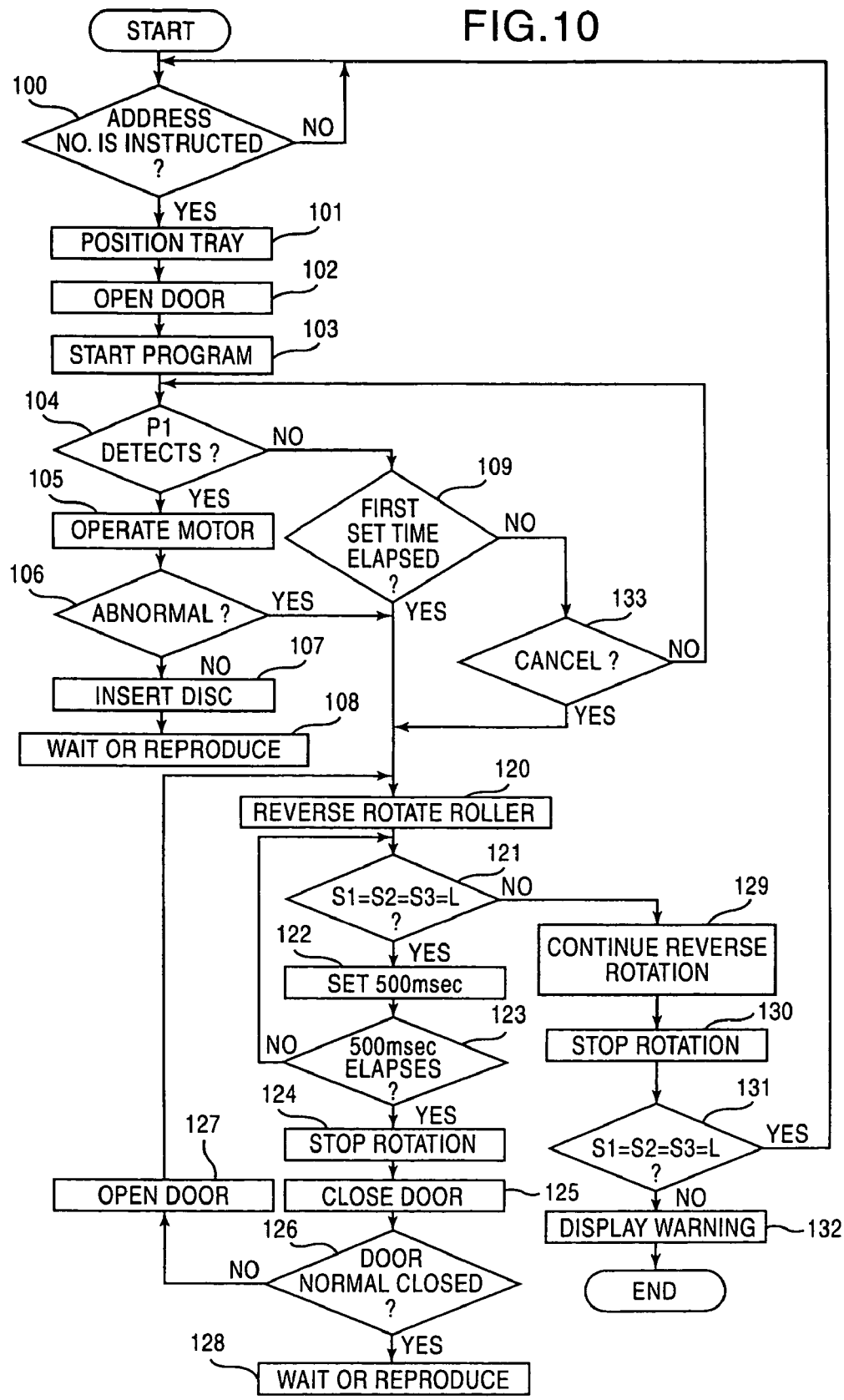
FIG. 10 shows a flowchart of a program in a controller.

The operation of the system is described with reference to FIG. 10 showing a flowchart of a program in the controller 30.

At a step 100, it is determined whether the address number of the tray 25 is instructed by operating one of the switches 32a–32f, and the instructed tray is positioned to the inserting opening by the elevator mechanism (step 101). At a step 102, the door of the opening is opened and the program timer 31 is started (step 103).

At a step 104, it is determined whether the signal S1 of the first photo-detector P1 becomes logic H which means a normal medium is inserted in the opening. If H, the program proceeds to a step 105, if L, the program goes to a step 109. At the step 105, the motor 26 is operated to rotate the roller 1a, 2a in the feeding direction.

At a step 106, it is determined whether there is an abnormal condition based on the signals S1–S3. If there is no abnormality, the disc is inserted (step 107). The completion of the disc insertion is detected by the switch HSW, and the motor 26 is stopped. The tray stack is vertically moved to position the desired disc at a waiting position or to reproduce the disc (step 108).

At the step 109, it is determined whether a first set time, for example, 4 seconds, elapses. If the time elapses at the step 109, or if there is abnormality at the step 106, the rollers 1a, 2a are rotated in the reverse direction at a step 120. If the set time does not elapse at the step 109, it is determined whether the instructed address set at the step 100 is canceled by the cancel switch 32g of FIG. 9 (step 133). If canceled, the rollers 1a, 2a are reversely rotated (step 120).

At a step 121, it is determined whether all output signals S1–S3 of the photodetectors P1–P3 are logic L because of the reverse rotation of rollers 1a, 2a. If it is the case, it is determined that a foreign object does not exist. Thereafter, a second time (500 msec) is set in the timer 31 at a step 122, and it is determined whether the second time elapses at a step 123. If not, a foreign object is reconfirmed at the step 121. If yes, the rollers 1a, 2a are stopped (step 124) and the door closed (step 125). When the door is normally closed at a step 126, the CD is positioned at the waiting position or reproduced (step 128). If the door is normally closed, the door is opened (step 127), and the program is returned to the step 120.

When all signals S1, S2 and S3 are not logic L at the step 121, the reverse rotation is continued (step 129) and then the rotation is stopped (step 130).

At a step 131, the exist of a foreign object is reconfirmed. When a foreign object is confirmed, warning is displayed and/or alarm is emitted at a step 132, and the operation of the device is stopped.

In accordance with the present invention, when insertion of a disc is not detected after the elapse of a predetermined time, disc carrying rollers are rotated in the reverse direction. In addition, after the elapse of the time, since the carrying rollers are reversely rotated, a disc and a foreign object cannot be inserted in the device.

While the invention has been described in conjunction with preferred specific embodiment thereof, it will be understood that this description is intended to illustrate and not limit the scope of the invention, which is defined by the following claims.

What is claimed is:

1. A system for reproducing a recording medium, comprising:
    an insertion opening;
    a storing device for storing the recording medium;
    a carrying device having rollers for carrying the recording medium;
    an instructing section outputting an insertion instruction of inserting the recording medium into the system;
    an insertion detector, which is disposed between the insertion opening and the rollers, detecting the recording medium inserted in the insertion opening; and
    a controller controlling the carrying device in response to the insertion instruction and a detection signal produced by the insertion detector,
    wherein the controller controls the carrying device to load the recording medium within a first predetermined time when the insertion detector detects the recording medium after the insertion instruction is output, such that the carrying device is actuated in a loading operation,
    wherein the controller controls the carrying device to unload the recording medium when the insertion detector does not detect the recording medium within the first predetermined time after the insertion instruction is output, such that the carrying device is actuated in an unloading operation, and
    wherein the controller continues the unloading operation of the carrying device for a second predetermined time when the carrying device is actuated in the unloading operation.

2. The system according to claim 1, wherein the controller generates a warning signal for giving user warning of an abnormality when the insertion of the recording medium is not detected within the first predetermined time.

3. The system according to claim 1, wherein the controller generates an unloading signal when the insertion instruction is cancelled.

4. The system according to claim 3, wherein the controller generates the unloading signal when the insertion instruction is cancelled within the first predetermined time so that the carrying device is actuated in the unloading operation.

5. The system according to claim 3, wherein the controller continues the unloading operation of the carrying device for a second predetermined time.

6. The system according to claim 1, wherein the detecting means further detects an abnormal condition and produces an abnormality signal, the control means responds to the abnormality signal to generate the unloading signal.

7. The system according to claim 1, wherein the insertion detector comprises a plurality of photodetectors.

8. The system according to claim 7, wherein the plurality of photodetectors are disposed for discriminating kinds of the recording medium.

9. The system according to claim 1, further comprising:
    a moving device for positioning a desired medium of media stored in the storing device at the insertion opening.

10. The system according to claim 9, wherein the moving device operates in response to the insertion instruction of the instruction section.

11. The system according to claim 1, further comprising:
    recording medium mounting sections provided in the storing device for storing a plurality of media;
    a moving device for vertically moving the recording medium mounting sections in the storing device; and
    a positioning device for positioning the recording medium mounting section having a desired medium at the insertion opening.

* * * * *